United States Patent [19]

Malonee

[11] 4,020,454
[45] Apr. 26, 1977

[54] BRAKE MONITORING SYSTEM

[76] Inventor: Arley L. Malonee, 540 Fresno St., Coalinga, Calif. 93210

[22] Filed: Feb. 17, 1976

[21] Appl. No.: 658,286

[52] U.S. Cl. .......................... 340/52 B; 340/52 A; 340/57; 200/61.4; 200/61.44
[51] Int. Cl.² .................................... B60T 17/22
[58] Field of Search ............... 340/52 A, 52 B, 69, 340/57; 200/61.4, 61.41, 61.42, 61.44, 153 H

[56] References Cited

UNITED STATES PATENTS

| | | | |
|---|---|---|---|
| 2,087,386 | 7/1937 | Norton | 340/52 A |
| 3,363,232 | 1/1968 | Mizsak | 340/52 A |
| 3,691,523 | 9/1972 | Helms et al. | 340/57 |

Primary Examiner—Alvin H. Waring
Attorney, Agent, or Firm—Huebner & Worrel

[57] ABSTRACT

A brake monitoring system particularly suited for use in monitoring brake shoe adjustment, brake lining wear and brake temperatures for rolling stock, such as trucks and the like, characterized by monitoring switches mounted on brake shoes. Selected switches are provided with resiliently supported shorting bars and actuating stems formed of durable dielectric materials connected with the switches for displacing the shorting bars in response to motion imparted to the stems through engagement with juxtaposed brake drums.

1 Claim, 8 Drawing Figures

BRAKE MONITORING SYSTEM

BACKGROUND OF THE INVENTION

1. Field of the Invention

The invention generally relates to brake monitoring systems, and more particularly to a brake monitoring system for a wheeled vehicle including at least one pair of arcuate brake shoes, including linings, circumscribed by an annular steel drum mounted on a rotatable wheel. The system is adapted to provide intelligence continuously indicative of brake adjustment, lining wear, and brake temperatures, whereby the condition of the brake lining continuously is monitored.

2. Description of the Prior Art

As readily can be appreciated by those concerned with safety in the maintenance and operation of automotive vehicles, brake failure resulting from worn and/or defective linings occurs all too frequently because of lack of awareness of brake adjustment, extent of wear and temperature of brake linings.

The prior art is, of course, replete with disclosures of monitoring systems provided for indicating the condition of brake linings, and/or of brake adjustment. For example, see U.S. Pat. No. 3,553,643. Such prior art disclosures, generally, describe contact indicators, for multi-wheel vehicles, which provide warning signals during periods in which electrical continuity is established between brake shoes and brake drums.

As can be appreciated by those familiar with the trucking industry, current safety regulations imposed by various governmental agencies tend to impede the use of systems having a capability for initiating combustion. Consequently, such regulations are particularly onerous where electrical contacts are likely to cause arcing in the vicinity of fuel vapors. Since arcing reasonably can be expected to occur, where an electrical continuity between a brake shoe and drum is repeatedly established and interrupted in the vicinity of the wheels of automotive vehicles, prior art devices and systems provided for monitoring brakes have not entirely satisfied existing needs.

Therefore, it is apparent that there currently exists a need for brake monitoring systems which are accurate, durable and safe to employ for providing intelligence indicative of brake adjustment, lining wear and operating temperatures.

It is a general purpose of the instant invention to provide a brake monitoring system which satisfactorily overcomes aforementioned difficulties and disadvantages.

OBJECTS AND SUMMARY OF THE INVENTION

It is, therefore, an object of the instant invention to provide an improved brake monitoring system which overcomes the aforementioned difficulties and disadvantages.

It is another object to provide a brake monitoring system which is accurate, durable and safe to employ for providing intelligence indicative of brake adjustment, wear and temperature.

It is another object to provide in a brake monitoring system an electrical circuit capable of providing intelligence indicative of brake adjustment, lining wear, and operating temperature.

It is another object to provide in a brake monitoring system an electrical switch for detecting improper brake adjustment.

Another object is to provide in a brake monitoring system, an electrical switch having a capability for detecting wear of brake linings.

It is another object to provide in a brake monitoring system an electrical switch having a capability for detecting brake operating temperatures.

It is another object to provide in a brake monitoring system an electrical circuit having a capability for detecting adjustment conditions relating to brake wear, and temperature and for providing alarm signals when predetermined conditions of adjustment, wear and temperatures are encountered.

Another object is to provide for brake shoes supported to engage a rotating drum a system through which brake adjustment, lining wear and operating temperatures are detected employing stems of dielectric materials at temperatures below those at which failure of the material occurs, due to excessive temperatures, although not necessarily restrictd to a use with brake shoe and drum combinations, since the circuitry can be employed equally as well when installed in brake systems characterized by disk and pad combinations. These and other objects and advantages are achieved through the use of a first plurality of electrical switches mounted on brake shoes for detecting brake wear, each of such switches being provided with a stem formed of a dielectric material and adapted to be displaced in response to an engagement thereof with and adjacent drum, a second plurality of switches mounted on the shoes, each of these switches also being provided with a displaceable stem formed of a dielectric material, for providing intelligence indicative of brake adjustment in response to an engagement thereof with an adjacent drum, and a final plurality of switches mounted on the shoes adapted to close in response to changes in temperature for providing warning signals when maximum operating temperatures are encountered, as will become more readily apparent by reference to the following description and claims in light of the accompanying drawings.

DESCRIPTION OF THE PREFERRED EMBODIMENT

Figure 1:
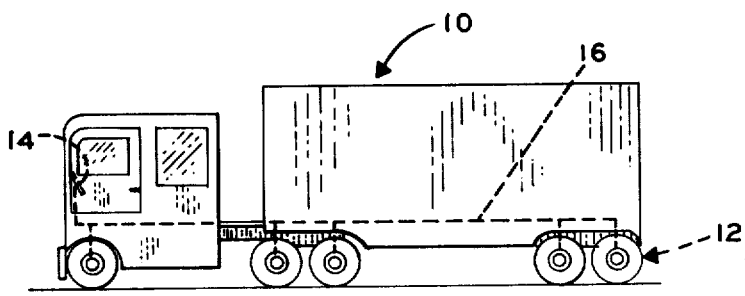
FIG. 1 is a diagrammatic view illustrating a brake monitoring system embodying the principles of the instant invention mounted on a vehicle.

Referring now to the drawings wherein like reference characters designate like or corresponding parts throughout the several views, there is shown, schematically, in FIG. 1, a vehicle, such as a truck-trailer rig, generally designated 10, equipped with a brake monitoring system which embodies the principles of the instant invention.

As shown, the rig 10 includes eighteen wheels, not designated. The monitoring system, shown in FIG. 1, therefore, includes eighteen wheel units 12 of a common design, each being provided for a given wheel of the vehicle. Each of the units 12 is connected with a display board 14, through circuit leads 16, preferably located in the cab of the rig 10. Circuit connections are made between the tractor and trailer of the rig 10 employing a suitable plug, not shown. It is to be understood that various types of vehicles may be equipped with the monitoring system and that as many wheels as is found desirable, for a given vehicle, are equipped with a wheel unit 12.

Figure 2:
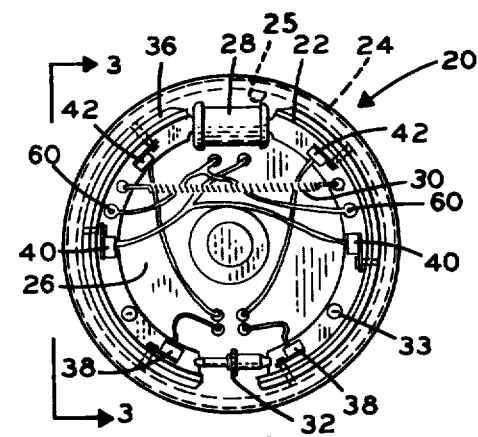
FIG. 2 is a side elevational view of a brake assembly provided for one wheel of the vehicle shown in FIG. 1, illustrating an arrangement of detection switches for the system.
Figure 4:
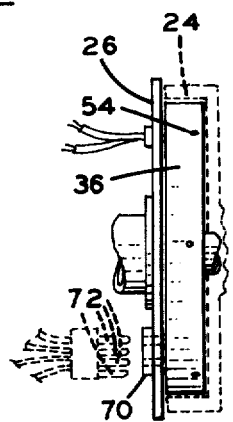
FIG. 4 is an end elevational view of the brake assembly shown in FIG. 2.

Since the wheel units 12 are of a common design, a detailed description of a single one of the wheel units is deemed sufficient to provide a complete understanding of the instant invention. Turning now to FIG. 2, wherein is illustrated a typical brake assembly, generally designated 20, it is noted that the brake assembly includes a pair of brake shoes 22 of known design, circumscribed by a rotatable brake drum 24, illustrated in phantom. The drum 24, of course, is connected to and rotates with a wheel, not designated.

As can be appreciated by those familiar with the operation of shoe-and-drum brake assemblies, the drum 24 includes an annular wear plate 25 while the shoes 22 form an expansible subassembly, not designated, concentrically related to the wear plate. The shoes 22 are supported by a backing plate 26 mounted on the axle housing of the vehicle in a manner well understood by those familiar with the design and fabrication of suspension systems. As a practical matter, the shoes also are connected with a brake cylinder 28 which serves to expand the subassembly and thus force the brake shoes outwardly into engagement with the wear plate of the drum 24, while a return spring 30 is provided for retracting the brake shoes out of an engaged relation with the wear plate. The distance through which the shoes travel is ldetermined by an adjustment spindle 32 which serves to establish the throw for the brake shoes in a manner well understood. Moreover, a shoe stabilizer 33 is provided, where so desired, for purposes also well understood by those familiar with the design and operation of brake assemblies.

Figure 3:
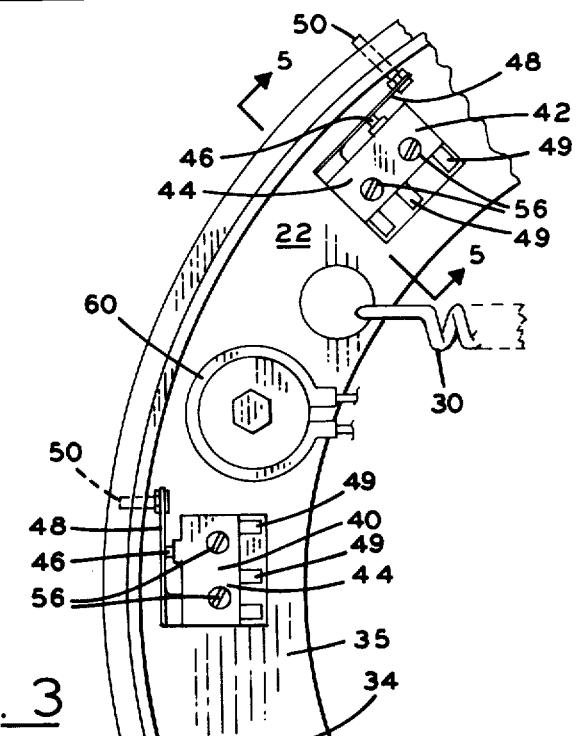
FIG. 3 is a fragmented view of one brake shoe, on an enlarged scale, illustrating one manner in which the detection switches are mounted.
Figure 5:
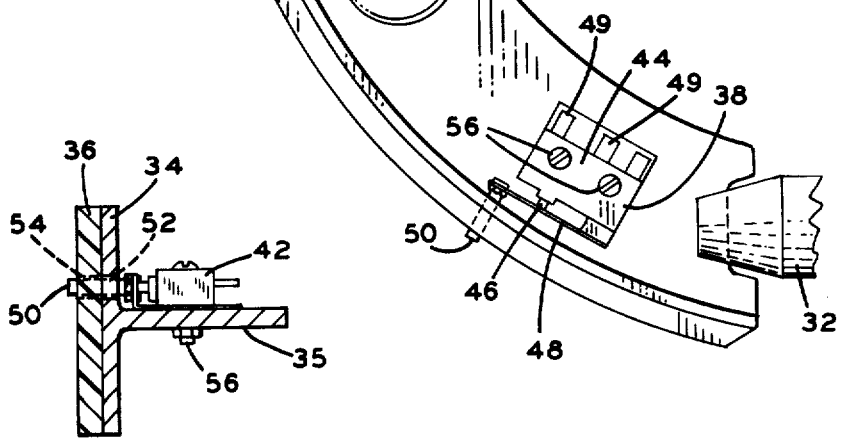
FIG. 5 is a cross-sectional view taken generally along line 5—5 of FIG. 3.

As best shown in FIGS. 3 and 5, each of the brake shoes includes a base plate 34 of an arcuate configuration mounted at the periphery of an arcuate web 35. At the external surface of the arcuate plate 34 there is affixed a lining 36. The specific manner in which the lining 36 is affixed to the plate 34 and the materials from which the lining is fabricated form no specific part of the instant invention. However, it is to be understood that, in practice, adhesives, rivets and the like are employed for affixing the lining to the plate 34 and that the lining 36 is formed of a non-metallic material, such as asbestos and the like, adapted to withstand elevated temperatures.

In view of the foregoing, it should be apparent that the brake monitoring system which embodies the principles of the instant invention is adapted to be mounted and employed for monitoring the conditions of brake shoes and linings within conventional brake assemblies. Therefore, since the specific brake assembly with which the brake monitoring system of the instant invention is employed forms no specific part of the instant invention, a more detailed description of the brake assembly is omitted in the interest of brevity.

Turning now to FIG. 3, it is noted that there is mounted on the web 35 a plurality of switches designated 38, 40 and 42, of a substantially common design. Each of these switches comprises a normally open microswitch, completely sealed within a housing 44 formed of a suitable heat resistant material, and includes a spring-biased plunger 46 projected from the housing 44. The plunger is supported in a projected relationship with the housing by a resilient member, not shown.

As can be appreciated by those familiar with the design and fabrication of microswitches, each of the plungers 46 is connected with a suitable shorting bar, not shown, normally supported in spaced relation with a pair of electrical contacts, so that upon being moved into engagement with the contacts a circuit is completed therebetween.

Affixed to each housing 44 is a resilient arm 48. This arm extends across the adjacent plunger and serves to depress the plunger 46 in response to a deflection thereof toward the housing 44. The arm 48 preferably is formed of a resilient material, such as spring steel. It is to be understood that the contacts of each switch are connected with suitable terminals 49 projected from the housing 44 for purposes of affording a connection of the switches within an electrical circuit of the monitoring system.

At the extended end of each of the resilient arms 48 there is provided a stem 50. This stem functions as a feeler and engages the adjacent surface of the wear plate 25 of the drum 24, in a manner and for a purpose which will hereinafter become more readily apparent.

It is important, at this juncture, to note that the stem 50 is secured to the end of the arm 48 in any suitable manner and that axial motion imparted to the stem in response to an engagement thereof with the surface of the wear plate and that such motion serves to deflect the arm 48 to which the stem is attached. Thus axial motion of the stem towards the housing 44 causes the arm 48, for each of the switches, to be deflected in a direction such that the plunger 46 associated therewith is depressed against the bias of the spring connected thereto. However, the spring constant of the arm is such that the stem 50 is returned to its initial position once the shoe is retracted with respect to the surface of the wear plate of the drum 24.

It is imperative that the stem 50 be formed of a suitable dielectric material, such as Mylar and the like, having good wear and temperature resistance characteristics. Thus arcing between the stems 50 and the wear plate 25 of the drum 24 is precluded as the stems engage and disengage the surface of the wear plate in response to motion imparted to the shoes 22.

In order to accommodate the stems 50, each of the arcuate plates 34 is provided with suitable apertures 52 aligned with apertures 54 formed in each of the linings 36. As shown in the drawings, the switches 38 and 42 are mounted adjacent the opposite ends of each of the shoes 22, while the switch 40 is mounted near the midportion of the shoe. As a practical matter, the switches 38, 40 and 42 are affixed to the web 35, employing any suitable means such as screws 56 and the like.

The switches 38 and 42 are so positioned as to assist in the adjustment of the brake shoes 22 relative to the adjacent surface of the wear plate 25 of the drum 24,and, consequently, are herein designated brake adjustment switches. Therefore, the stem 50 for each of the switches is projected slightly above the surface of the lining 36, for each of the shoes, so that contact between the stems and the surface of the wear plate 25 is achieved before engagement of the lining with the wear plate occurs as the shoes are moved outwardly. Thus it is possible to advance the shoes outwardly employing the spindle 32 until engagement of the stem occurs, for closing the switches 38 and 42, and as the spindle is backed-off for permitting the stems to disengage the wear plate 25 the switches 38 and 42 are permitted to open. At this point sufficient clearance is established between the surfaces of the brake lining 36 and the surface of the wear plate 25 of the drum 24.

The switch 40 is provided for detecting the extent of lining wear, and, therefore,is herein designated a wear detection switch. Consequently, the length of the stem 50 is such that the stem extends partially through the aperture 54 formed within the lining 36. For example, where it is desirable to detect brake wear after 80 percent of the lining has been worn away, the stem 50 is extended through approximately 20 percent of the thickness of the lining. Thus the stem 50 engages the surface of the wear plate 25 of the brake drum 24 once 80 percent of the lining has worn away.

Of course, one of the causes of brake failure is that of overheating resulting from the effects of a frictional engagement of the surfaces of the brake lining with the wear plate. In practice, various devices have been provided for cooling the brake linings, including jets through which is achieved an application of a coolant, such as water or the like, to the linings. However, until an operator has been made aware of the heated condition, normally the water is not applied. Since the temperature attainable within a brake shoe, as a precautionary measure, may exceed the temperatures at which the housing 44 and stem 50 for the switches tends to fail, it is desirable to detect the temperatures before such overheating occurs. Consequently, a normally open temperature detection switch 60, such as a thermocouple, is mounted on the web 35 in the vicinity of the switches 38, 40 and 42 for providing warning signals indicating overheated conditions. Since the temperature detection switches are well understood, a detailed description of the switch 60 is omitted in the interest of brevity. However, the switch, where so desired, is formed of bi-metal, and closes in response to temperatures of preselected magnitudes.

Figure 6:
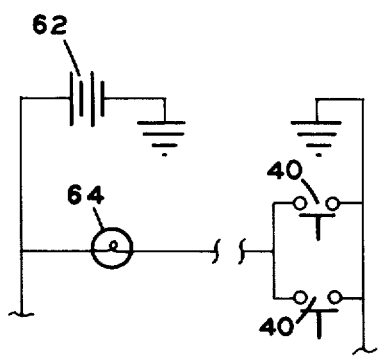
FIG. 6 is a partial schematic view of an electrical circuit within which a wear monitoring switch for the shoes of a given wheel is connected.
Figure 7:
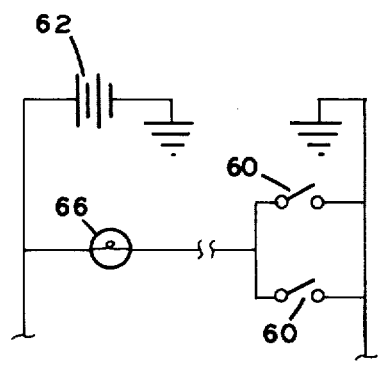
FIG. 7 is a partial schematic view of an electrical circuit within which a temperature monitoring switch for the shoes of a given wheel is connected.

Turning now to FIG. 6, each of the switches 40 for one of the brake shoes 22 is connected in parallel with the switch 40 mounted on the adjacent shoe. These switches are connected, within an electrical circuit, to a source of potential 62 and a series-connected signal lamp 64. Similarly, each of the switches 60, for the shoes 22, is connected in parallel with the switch of the adjacent shoe and is connected in parallel with the source of electrical potential 62 and a series signal lamp 66.

It should, therefore, be apparent that as either of the switches 40, for either of the shoes 22, for a given wheel, is closed a signal lamp 64 connected in series therewith is energized for providing an alarm signal indicative of wear. Similarly, when either of the switches 60 are closed, the lamp 66 connected therewith is energized for providing an alarm signal indicating that an overheated condition for a given wheel has been achieved. An operator of the vehicle then takes suitable precautionary measures for purposes of cooling the brakes.

Figure 8:
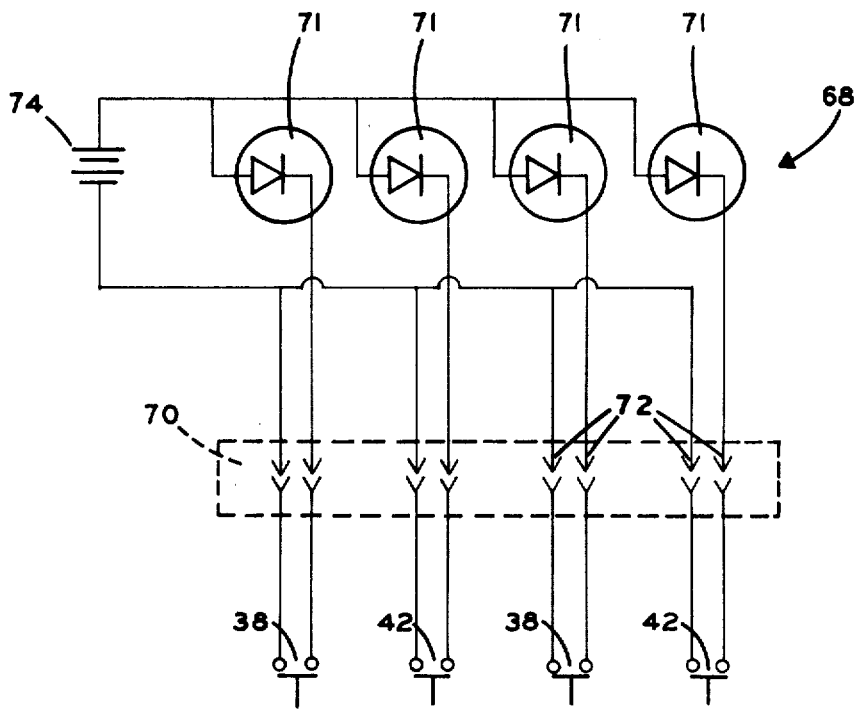
FIG. 8 is a schematic view of an electrical circuit including LED (light emitting diodes) connected for purposes of indicating brake adjustment.

On the other hand, the conductive condition of the switches 38 and 42 is determined through the use of a testing device 68 when the vehicle is at rest, such as periods during which the brakes are adjusted manually. As a practical matter, each of the switches 38 and 42 for each of the shoes 22 is connected in series between the opposite terminals of a female receptacle plug 70 mounted on the backing plate 26. The testing device 68 includes a plurality of light emitting diodes 71 connected in series between pins 72 and a source of electrical potential 7, FIG. 8. The pins 72 when inserted into the receptacle 70 serve to close a circuit through the diodes 71 and the switches 38 and 42 mounted on the shoes 22. The diodes 71 are energized as the switches 38 and 42 are closed in response to an engagement of the stems 50 thereof with the wear plate 25, as hereinbefore discussed.

OPERATION

It is believed that in view of the foregoing description, the operation of the device will readily be understood and it will be briefly reviewed at this point.

The brake monitoring system which embodies the principles of the instant invention is mounted in the manner hereinbefore described. Thus the system is prepared for operation by first connecting the testing device 68 with the switches 38 and 42, by inserting the pins 72 into the receptacle 70 for each of the wheels, which are to undergo brake adjustment operations. Brake adjustment is achieved simply my manipulating the spindle 32 for first causing the stems 50, which function as feelers, to engage the adjacent surface of the wear plate 25 for the adjacent drum 24 for thus causing the switches 38 and 42 to close. The diodes 71 are energized as the stems engage the wear plate and thus are illuminated. The spindle is then reversibly manipulated for extinguishing the diodes at which time it becomes apparent that the associated switch 38 or 42 has opened in response to a disengagement of the stems 50 with the wear plate. Suitable clearance is thus established between the adjacent surfaces of the brake lining 36 and wear plate 25 is thus established.

Upon being operated, should the brake shoes begin to overheat, due to heat generated through frictional contact being established between the wear plate and the brake lining, the switches 60 are closed for thus causing the lamp 66 connected in series therewith to be energized, preferably at the display board 14 located in the operator's compartment. The operator now takes precautionary measures for cooling the brakes for thus avoiding destruction of the brakes and/or destruction of the switches 38 through 42.

Upon being operated for a predetermined period of time, the linings 36 experience wear due to friction. As the linings. wear, the surface of the linings continue to advance toward the adjacent ends of the stems 50, serving a feelers for the switches 40. Of course, the linings wear at a greater rate than the stem 50, due to the difference in materials employed in fabricating the linings and the stems, so that the stems eventually extend beyond the surface of the linings 36. At such times, movement of the shoes 22, in braking operations, causes the stems 50 to engage the adjacent surface of the wear plate 25, whereupon axial displacement of the stems occurs for deflecting the arms 48 for the switches 40. Deflection of the arms, aas hereinbefore described, causes the plunger 46 to be depressed for closing a circuit therethrough. Closure of circuits within the switches 40 serves to connect the lamp 64, preferably at the display board 14, with the source of potential 62 for thus causing the lamp 64 to be energized and thus illuminated.

In view of the foregoing, it should be readily apparent that the brake monitoring system which embodies the principles of the instant invention serves to continuously monitor conditions of brakes aboard operating vehicles, whereby safety of the operator and the vehicle is enhanced.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A brake monitoring system particularly suited for use in monitoring brake shoe adjustment, brake lining wear and brake temperature for the brake shoes of an expansible brake shoe subassembly circumscribed by a metallic wear plate of an annular brake drum subassembly for one wheel of a wheeled vehicle comprising:

A. at least two groups of normally open electrical switches, each group consisting of a pair of brake adjustment switches and a wear detection switch, each switch of each group being characterized by a resiliently supported shorting bar and an axially movable stem formed of Mylar and connected with the switch for displacing the shorting bar in a circuit closing direction;

B. means for separately mounting the switches of each group in angular spaced relation on a given brake shoe of a radially expansible brake shoe subassembly having a non-metallic lining, the thickness of which is reducible by wear, with the stem of each switch being projected axially into an aperture extended radially through the lining, the stem of each brake adjustment switch being characterized by a length such that the stem extends through the lining for engaging the circumscribing wear plate of a brake drum subassembly as the brake shoe subassembly is expanded, whereby axial motion is imparted to the stem, while the stem of the wear detection switch is characterized by a length such that the stem extends through the lining for engaging the wear plate, as the brake shoe subassembly is expanded, only after the thickness of the lining has been reduced by wear, whereby axial motion is imparted to the stem, subsequent to a reduction in the thickness of the lining;

C. a pair of circuits, each of which includes a pair of pin-receiving sleeves supported in a fixed relationship adjacent to the brake shoe subassembly and singly connected to one brake adjustment switch, and a testing circuit having an alarm signal generator connected with a pair of terminal pins adapted to be received by said pin-receiving sleeves;

D. an alarm circuit connected with the wear detection switch of each group including a remotely related alarm signal generator for generating an alarm signal in response to axial motion imparted to the stem of the wear detection switch; and E. a pair of temperature responsive switches, each being separately mounted on one brake shoe of said pair of brake shoes and connected in a circuit including an alarm signal generator for completing the electrical circuit in response to changes of determinable magnitude in the temperature of the brake shoe on which the switch is mounted.

* * * * *